United States Patent
Boehm et al.

(10) Patent No.: US 11,789,647 B2
(45) Date of Patent: Oct. 17, 2023

(54) ADDRESS VERIFICATION FOR A MEMORY DEVICE

(71) Applicant: Micron Technology, Inc., Boise, ID (US)

(72) Inventors: Aaron P. Boehm, Boise, ID (US); Scott E. Schaefer, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/098,096

(22) Filed: Nov. 13, 2020

(65) Prior Publication Data

US 2021/0191660 A1   Jun. 24, 2021

Related U.S. Application Data

(60) Provisional application No. 62/951,517, filed on Dec. 20, 2019.

(51) Int. Cl.
*G06F 3/06* (2006.01)

(52) U.S. Cl.
CPC .......... *G06F 3/0659* (2013.01); *G06F 3/0604* (2013.01); *G06F 3/0671* (2013.01); *G06F 2212/7209* (2013.01)

(58) Field of Classification Search
CPC .... G06F 3/0659; G06F 3/0604; G06F 3/0671; G06F 3/0679; G06F 3/0688;

(Continued)

(56) References Cited

U.S. PATENT DOCUMENTS

| | | | | |
|---|---|---|---|---|
| 5,193,153 A | * | 3/1993 | Soutoul | G06F 5/10 365/73 |
| 2009/0237978 A1 | * | 9/2009 | Lee | G11C 8/12 365/148 |

(Continued)

FOREIGN PATENT DOCUMENTS

KR   20190102530 A   9/2019

OTHER PUBLICATIONS

Wang, D. T., Ng, S. W., & Jacob, B. (2008). Memory systems: Cache, Dram, disk. Morgan Kaufmann Publishers. (Year: 2008).*

(Continued)

*Primary Examiner* — Kalpit Parikh
(74) *Attorney, Agent, or Firm* — Holland & Hart LLP

(57) ABSTRACT

Methods, systems, and devices for address verification for a memory device are described. When a memory device receives a write command, the memory device may store, in association with the data written, an indication of a write address associated with the write command. When the memory device receives a read command, the memory device may retrieve data and a previously stored write address associated with the retrieved data, and the memory device may verify a read address associated with the read command against the previously stored write address associated with retrieved data. Thus, for example, the memory device may verify whether data read from the memory array based on an address associated with a read command is data that, when previously written to the memory array, was written in response to a write command associated with a matching address.

22 Claims, 8 Drawing Sheets

(58) Field of Classification Search
CPC .......... G06F 3/0622; G06F 3/06; G06F 3/067; G06F 2201/7209
See application file for complete search history.

(56) References Cited

U.S. PATENT DOCUMENTS

| | | | |
|---|---|---|---|
| 2014/0369139 A1 | 12/2014 | Van Winkelhoff et al. | |
| 2016/0162355 A1* | 6/2016 | Mizrachi | G11C 16/349 |
| | | | 714/57 |
| 2017/0010980 A1* | 1/2017 | Bernasconi | G06F 13/404 |
| 2018/0012655 A1* | 1/2018 | Senoo | G11C 11/005 |
| 2018/0081774 A1* | 3/2018 | Kawamura | G11C 29/52 |
| 2018/0182446 A1* | 6/2018 | Kondo | G11C 11/409 |
| 2018/0286494 A1 | 10/2018 | Lovett et al. | |
| 2019/0163367 A1* | 5/2019 | Bazarsky | G06F 3/0679 |
| 2019/0340125 A1 | 11/2019 | Mondello et al. | |

OTHER PUBLICATIONS

ISA/KR, International Search Report and Written Opinion of the International Searching Authority, Int'l Appl. No. PCT/US2020/061247, dated Mar. 9, 2021, Korean Intellectual Property Office, Seo-gu, Daejeon, Republic of Korea, 10 pgs.

* cited by examiner

ADDRESS VERIFICATION FOR A MEMORY DEVICE

CROSS REFERENCE

The present Application for patent claims the benefit of U.S. Provisional Patent Application No. 62/951,517, by BOEHM et al., entitled "ADDRESS VERIFICATION FOR A MEMORY DEVICE," filed Dec. 20, 2019, assigned to the assignee hereof, and expressly incorporated by reference herein.

BACKGROUND

The following relates generally to one or more memory systems and more specifically to address verification for a memory device.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
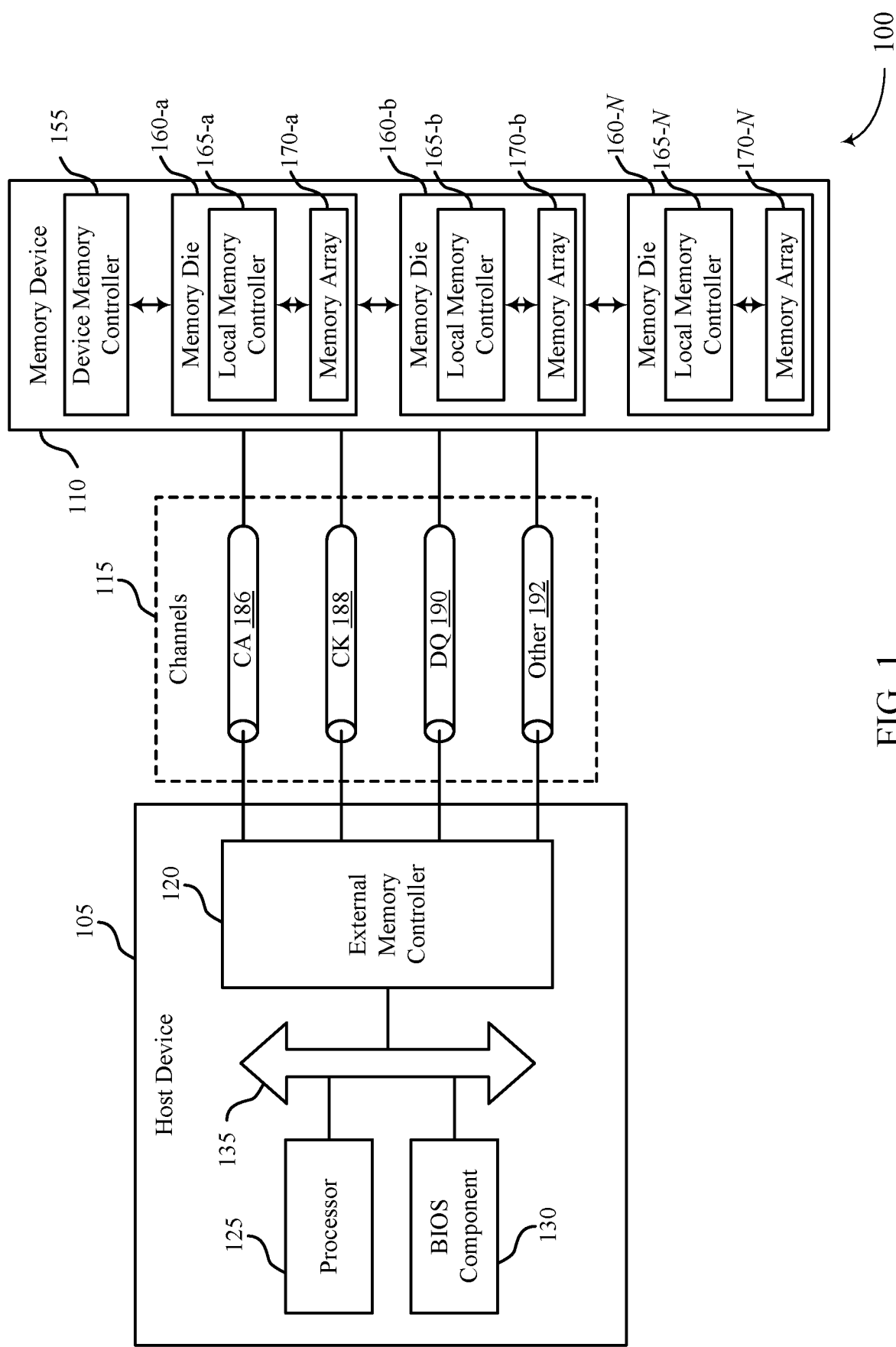
FIG. 1 illustrates an example of a system that supports address verification for a memory device in accordance with examples as disclosed herein.

Memory devices may operate under various conditions as part of electronic apparatuses such as personal computers, wireless communication devices, servers, internet-of-things (IoT) devices, electronic components of automotive vehicles, and the like. In some cases, memory devices supporting applications for certain implementations may be subject to increased reliability constraints (e.g., automotive vehicles, in some cases with autonomous or semi-autonomous driving capabilities). As such, memory devices (e.g., DRAM) for some applications may be expected to operate with a reliability subject to relatively higher industry specifications (e.g., higher reliability constraints). For other applications, increased reliability of a memory device may nevertheless be beneficial.

Some memory systems include error detection techniques that focus on whether data comprises correct logic values (e.g., correct bit values). Such error detection techniques may detect whether data was corrupted during transmission between a host device and memory device (e.g., due to one or more bit values being misinterpreted or lost) or while stored in a memory array (e.g., due to the state of one or more memory cells failing to be written, maintained, or read correctly). However, instances may occur where valid data (e.g., uncorrupted data) is written to or read from an incorrect address within a memory array. For example, if an address is improperly decoded at a memory device or an error occurs at a row decoder, column decoder, or other internal component within the memory device (e.g., a decoder activates a wrong access line), such an error may go undetected using some error detection techniques. Despite the data being valid (e.g., not subject to a transmission or storage error), errors may nevertheless occur in such situations due to the wrong data being transmitted between the host device and memory array (e.g., data read from the wrong location within a memory array, or data read from the correct (intended) location but after having been erroneously written to that location). A failure to detect such address- and location-related errors may negatively affect the reliability of the system.

As described herein, a memory system may be configured to determine whether data read from a location within a memory array (e.g., a location identified by an address within the array) is data that was properly written to that location previously (e.g., whether data read from a location with the memory array was meant to have been previously written to that location). For example, when the memory device receives a write command, an indication of an address associated with the write command (e.g., a logic or physical address associated with the data subject to the write command, which may be referred to as a write address) may be stored to a portion of a memory array that is designated for storing copies of write addresses. For example, the indication of the write address may include the write address, a subset of the write address, parity information based on some or all of the write address, or any combination thereof. Further, any quantity of copies of such an indication may be stored, with multiple copies providing redundancy and related reliability benefits in some cases (e.g., two or more copies of the write address may be stored). The indication of the write address may be stored within the memory array and in association with the related data (e.g., within the same row or page as the data that is written in response to the write command).

When the memory device reads data in response to a read command, the write address previously stored in association with the retrieved data may be verified relative to the read address associated with the read command. That is, for example, the memory device may receive an address associated with a read command (e.g., a logic or physical address associated with the data subject to the read command, which may be referred to as a read address), retrieve data from the memory array based on the read address (e.g., from a location corresponding to the read address), and also retrieve from the memory array an indication of a write address that was previously stored in association with (e.g., in the same row as, in the same page as) the retrieved data. The memory device then may compare the retrieved indication of the write address with a like indication of the read address (e.g., may calculate, generate, or otherwise obtain an analogous indication of the read address to support an apples-to-apples comparison with the retrieved indication of the write address). Generally, techniques as described herein may be referred to as address data copy verification (ADCV), as one example.

By verifying the read address associated with a read command and a previously received write address associated with data retrieved in response to the read command (e.g., comparing indications thereof), the memory system may determine whether data being read from an address within the array (e.g., the data associated with the read command) is data that was meant to have been previously written to that address. Such address verification may improve the reliability of the memory device or a memory system that includes the memory device. Further, in some cases, a portion of a memory array (e.g., one or more subarrays of the array, a subset of the columns of the array or of a subarray) may be designated (e.g., dedicated) for storing indications of write addresses, and existing storage may be utilized for address verification (e.g., overall array size or die size need not be increased).

Features of the disclosure are initially described in the context of memory systems dies as described with reference to FIGS. 1 and 2. Features of the disclosure are described in the context of circuit and device diagrams as described with reference to FIGS. 3-5. These and other features of the disclosure are further illustrated by and described with reference to an apparatus diagram and flowcharts that relate to address verification for a memory device as described with references to FIGS. 6-8.

FIG. 1 illustrates an example of a system 100 that supports address verification for a memory device in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or a system on a chip (SoC), among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package. In some examples, the memory array 170 may include one or more sub-arrays (e.g., as described with reference to FIG. 3). At least one sub-array may be configured to store a copy of an address associated with the write command (e.g., a write address). The stored copy of the address may be compared with data subject to a read command.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105. As described herein, a copy of an address associated with the write command (e.g., a write address) may be stored to a portion of a memory array 170. The stored copy of the address may be compared with data subject to a read command, which may improve the reliability of the memory system.

A local memory controller 165 (e.g., local to a memory die 160) may be operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

The memory device 110 may be configured to determine whether data read from a location within the memory array 170 is data that was correctly written to that location in response to a prior write command. As discussed herein, the memory device 110 may receive write commands from the host device 105. When the memory device 110 receives a write command, an indication of an address associated with the write command (e.g., an indication of a write address) may be stored to a portion of a memory array 170. The memory device 110 may also receive read commands from the host device 105. In response to a read command, the memory device 110 may verify the read address associated with the read command against the indication of the write address that is associated with the data stored within the memory array 170 at the location corresponding to the read address. If the addresses (e.g., indications thereof) match or are otherwise determined as not indicating an error condition, the read data may be output by the memory device 110. In some examples, if the addresses (e.g., indications thereof)

do not match, the memory device 110 may notify the host device 105 that the addresses do not match (e.g., by outputting an error flag or by storing an error flag for later polling by the host device 105). The memory device 110 may or may not output the read data if the addresses do not match, and may or may not notify the host device 105 if the addresses do match, depending on implementation. Such address verification may improve the reliability of the memory device 110.

Figure 2:
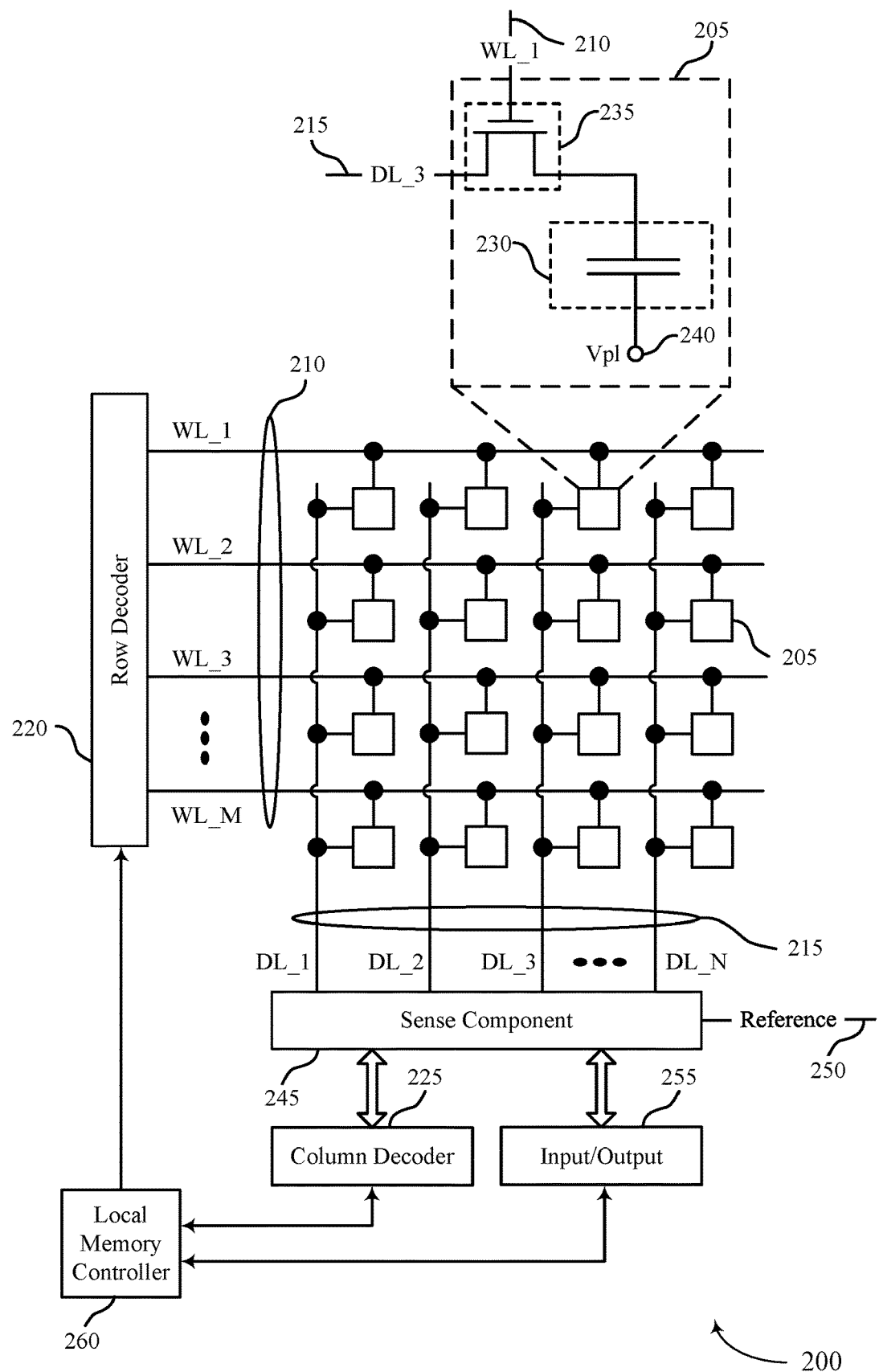
FIG. 2 illustrates an example of a memory die that supports address verification for a memory device in accordance with examples as disclosed herein.

FIG. 2 illustrates an example of a memory die 200 that supports address verification for a memory device in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., a programmed one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address. In some examples, the memory die 200 may receive a write command (e.g., from a host device). The row decoder 220 and column decoder 225 may decode the write address, and the associated data may be stored to one or more memory cells 205. A copy of the write address may be stored to a portion of the memory die 200. When the memory die 200 receives a read command for the data associated with the stored write address, an address associated with the read command (e.g., a read address) may be compared with the stored write address. If the addresses match, the data may be read from the memory die 200.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. The local memory controller 260 may be operable to perform other access operations not listed here or other operations related to the operating of the memory die 200 that are not directly related to accessing the memory cells 205.

The memory die 200 may be configured to determine whether data read from one or more memory cells 205 is data that was previously associated with a write command for those same memory cells 205. As discussed herein, when a write command for the memory die 200 is received, the row decoder 220 and the column decoder 225 may decode the associated address and activate one or more appropriate word lines 210 and bit lines 215 to write the data to the one or more memory cells 205 corresponding to the write address associated the write command. Also, an indication of the write address may be stored to a portion of the memory die 200, such that when a read command that results in an access of the same memory cells 205 is subsequently received, the previously stored indication of the write address may be verified against the read address associated with the read command. Verifying whether the data being read from the array was properly written to the address from which the data is being read may improve the reliability of the memory die 200.

Figure 3:
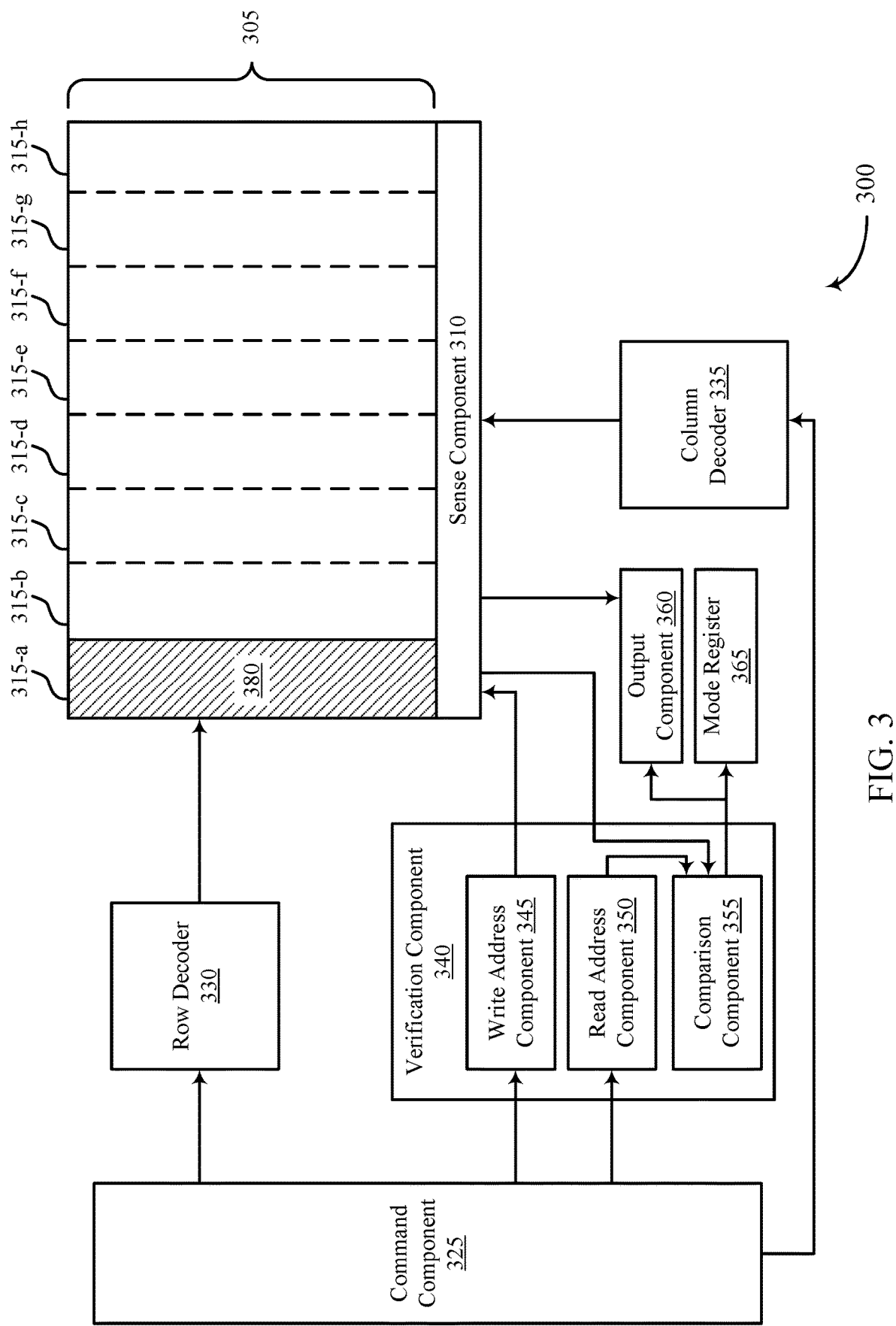
FIG. 3 illustrates an example of a memory device that supports address verification in accordance with examples as disclosed herein.

FIG. 3 illustrates an example of a memory device 300 that supports address verification in accordance with examples as disclosed herein. The memory device 300 may include one or more components described herein with reference to FIGS. 1 and 2. For example, the memory device 300 may include a row decoder 330 (which may be an example of a row decoder 220 as described with reference to FIG. 2) and a column decoder 335 (which may be an example of a column decoder 225 as described with reference to FIG. 2). The memory device 300 may also include a memory array 305, a command component 325, a verification component 340, an output component 360, and a mode register 365. In some examples, the verification component 340 may include a write address component 345, a read address component 350, and a comparison component 355. The verification component 340 may be configured to very a read address associated with a read command for data against a write address associated a write command previously received by the memory array 305. By verifying the read and write addresses associated with data read from the memory array 305, the memory device 300 may determine whether data being read from the array (e.g., the data read in response to a read command associated with a read address) was previously written to the memory array 305 based on a write address that matches the read address, which may improve the reliability of the memory device 300.

Memory array 305 may include a plurality of memory cells. The memory cells of the memory array 305 may be organized into groups from which data may be concurrently read or written (e.g., in response to a single access command), and such groups may be referred to as a page (e.g., a page of memory cells, a page of data). For example, the memory cells with the memory array 305 may be arranged into rows and columns, and each row of memory cells may correspond to a different page. In some examples, the memory array 305 may also be divided into any quantity of subarrays 315. For example, different subsets of the columns may correspond to different subarrays 315. In some cases, each subarray 315 may be coupled with a sense component 310 (e.g., with one or more corresponding sense amplifiers within the sense component 310), which may be an example of the sense component 245 as described with reference to FIG. 2. For example, the memory array may include 2,048 columns of memory cells, divided into eight (8) subarrays 315 that each include 256 columns. It is to be understood that these and other specific numbers used herein are purely for clarity in illustrating related concepts, and are not limiting.

A portion 380 of the memory array 305 may be dedicated to storing indications of write addresses. For example, a subset of the columns of the memory array 305 or of a subarray 315 may be dedicated to storing indications of write addresses. Within a row or memory cells, the memory cells within the portion 380 may be used to store indications of write addresses associated with data stored to other memory cells of the row. In some cases, the portion 380 may be a subset of the columns of the memory array 305. Additionally or alternatively, in some cases, the portion 380 may include one or more subarrays 315 (e.g., as illustrated in the example of FIG. 3, in which the portion 380 corresponds to subarray 315-*a*), but it is to be understood that the boundaries of the portion 380 need not align with subarray 315 boundaries. Where the portion 380 corresponds to one or more subarrays 315, then a page size for application date may be reduced accordingly—e.g., in the example of FIG. 3, the memory array 305 may support a page size of 2,048 bits (e.g., due to having 2,048 columns), but when address verification is enabled and the portion 380 corresponds to subarray 315-*a*, the page size for application data may be reduced to 1,792 bits. In some cases, different subsets of the columns (or other cell groupings) within the portion 380 may correspond to different subarrays 315 (e.g., within the portion 380, a first subset of columns may be used to store indications of write addresses associated with subarray 315-*b*, a first subset of columns may be used to store indications of write addresses associated with subarray 315-*c*, and so on).

The memory array 305 may be coupled with the command component 325 via the row decoder 330 and/or column decoder 335. In some examples, the command component 325 may communicate with a host device (not shown) to receive write commands or read commands for the memory array 305. For example, the command component 325 may receive commands from the host device that include an instruction for an access operation (e.g., a read operation, a refresh operation, a write operation) at memory array 305. The command may further include or otherwise indicate an address of the memory array 305 targeted by the access operation. The address may comprise, for example, a row address and a column address corresponding to one or more rows and columns of the memory array 305. The memory device 300 may utilize a verification component 340 in order to determine (e.g., identify, detect) errors associated with the transferring, decoding, or execution of the command received from the host device. In some cases, determining the errors may improve the reliability of the memory device 300. For example, the memory device 300 may ensure that data is written to or read from a correct address.

The memory device 300 may utilize the verification component 340 to ensure that data is written to or read from a correct address. For example, when the command component 325 receives a write command for the memory array 305, the write address component 345 may receive the write address or an indication thereof from the command component 325, and the write address component 345 may store (e.g., write) an indication of the write address to the portion 380. The stored indication of the write address may be stored in association with (e.g., in the same page as) the data corresponding to the write command. For example, the data may be stored to a portion of a row within the memory array 305 (or portions of multiple rows) (e.g., based at least in part on actions by the row decoder 330, column decoder 335, or sense component 310, or any combination thereof), and the indication of the associated write address may be stored to some or all of the remaining portion of the row (or the remaining portions of the multiple rows) within the portion 380.

When the command component 325 receives a read command for data stored to the memory array 305, data may be read from the memory array 305 (e.g., based at least in part on actions by the row decoder 330, column decoder 335, or sense component 310, or any combination thereof), and the read address component 350 may receive an indication of the read address associated with the read command from the command component 325. The indication of the write address previously stored in portion 380 in association with the read data may be also be read from the memory array 305 (e.g., based at least in part on actions by the row decoder 330, column decoder 335, or sense component 310, or any combination thereof), and the read address component 350 may receive the previously stored write address indication (e.g., from the sense component 310).

In some examples, when data is read from the memory array 305 in response to a read command, the comparison component 355 may compare (i) the indication of the write address that is retrieved from the portion 380 based on being stored in association with the data subject to the read command with (ii) a like indication of the read address associated with the read command. Such verification may indicate whether the two indications match, and thus whether the data read in response to the read command was read from a location to which data associated with a matching write address was previously written (and thus whether the read command and the preceding write command for the data were executed at the right location with the memory array 305). For example, the comparison component 355 may receive the retrieved indication of the write address from the read address component 350, and the comparison component 355 may receive the read address from the command component 325 and generate a suitable indication thereof (or receive the indication from the command component 325). The indication of the write address may comprise a copy of the write address, a copy of a subset of the write address, parity information based on the write address, or any combination thereof—and thus the like indication of the read address may comprise a copy of the read address, a copy of a subset of the read address, parity information based on the read address, or any combination thereof.

If the comparison component 355 determines (e.g., based on comparing associated indications) that (i) the read address associated with a read command matches (ii) the write address associated with data retrieved from the memory array 305, then the comparison component 355 may identify that there is no address error associated with the data. If the comparison component 355 determines (e.g., based on comparing associated indications) that (i) the read address associated with a read command does not match (ii) the write address associated with data retrieved from the memory array 305, then the comparison component 355 may identify that there is an address error associated with the data.

If there is an address error associated with a read command, the comparison component 355 may indicate the address error to an external device (e.g., a host device 105). For example, the comparison component 355 may send an indication of the address error to the output component 360, which may in turn indicate the address error to the external device. Additionally or alternatively, the comparison component 355 may update the mode register 365 to include an indication of the address error (e.g., for subsequent polling by the external device, for error logging or performance tracking). When read data is associated with an address error, the output component 360 may or may not output the read data to the external device, depending on implementation.

If there is no address error associated with a read command, the comparison component 355 may indicate the lack (absence) of an address error to the output component 360, which may output the read data to an external device (e.g., a host device 105). When read data is not associated with an address error, the output component 360 may or may not an indication of the lack of an address error, and the comparison component 355 may or may not update the mode register 365, depending on implementation.

In some examples, rather than perform address verification internally, a memory device may output one or more underlying pieces of information (e.g., may output one or more previously stored indications of a write address) in response to a read command (along with the data read from the memory array 305 based on the read command), and an external device such as a host device may perform address verification (e.g., may receive information described herein as received by verification component 340 and may perform one or more operations ascribed herein to verification component 340). In such examples, the output component 360 may output to the external device the information that supports the verification.

As previously stated, an indication of a write address may be a copy of the write address, a copy of a subset of the write address, or parity information based on some or all of the write address, or any combination thereof. In some cases, data may be addressed and accessed (e.g., written and read) on a per-subarray 315 basis. In some such cases, portions of a row of memory cells within different subarrays 315 may be independently operable and may be referred to as sub-rows or sub-pages.

For example, a write address for a single sub-page of data may include a finite quantity of address bits, such as twenty-eight (28) bits. Thus a write address received by the command component 325 may include a quantity of bits that is a multiple of the quantity of subarrays. For example, setting aside the portion 380 may leave the memory array 305 with seven (7) subarrays for storing data (which may also be referred to as operational data or application data). In such an example, the write address received by the command component 325 may include 196 bits. Thus, if the write indication is a complete copy of the write address, the write address component 345 may store a copy of the write address (e.g., the 196 bits) to the portion 380 of the memory array 305.

In other examples, where the write indication is a copy of a subset of the write address, the write address component 345 may store a copy of a subset of the write address to the portion 380 of the memory array 305. For example, a write address for a single sub-page of data may include a finite quantity of bits, such as twenty-eight (28) bits, and the stored subset may include the nine (9) most-significant bits and the nine (9) least-significant bits for each sub-page address—and thus eighteen (18) total bits for each sub-page address, and a total of 126 bits—and thus the write address component 345 may store a copy of the subset of the write address (e.g., the 126 bits) to the portion 380 of the memory array 305.

In some examples, multiple copies of an indication of a write address may be stored to the portion 380, which may provide enhanced reliability or other benefits. For example, if a 126 bit subset of a write address is stored as the indication thereof, as described in the preceding example, two copies (and thus 252 total bits) may be stored to the portion 380. Further, in lieu of or in addition to some or all of the bits of a write address, an indication of a write address may include parity information (one or more parity bits) calculated based on some or all of the bits of a write address. Read address component 350 may process the bits of a read address to obtain an indication thereof according to a same algorithm used by write address component 345 to obtain an indication of a write address, to support an apples-to-apples comparison by the comparison component 355.

In one example in which multiple copies of an indication of a write address are stored in the portion 380, the comparison component 355 may compare the stored copies before comparing either copy with a corresponding indication of a read address. If the stored write address indication copies match, then the comparison component 355 may compare either copy with the corresponding indication of the read address to determine whether there is an address error. If the stored write address indication copies do not all match each other, an indication of such may be output to an external device (e.g., host device) by way of output component 360 or stored to the mode register 365. For example, a quantity of stored copies of the indication of the write address that match or do not match the corresponding indication of the read address may be indicated, thereby providing an indication of a degree of confidence with respect to whether there is an address error (e.g., that there is a potential address error). Such an indication of a degree of confidence may be provided instead of or in addition to a binary (e.g., yes/no) indication of whether there is an address error (e.g., a binary indication may indicate that there is an address error if any one or more stored indication of the write address does not match the corresponding indication of the read address).

In another example in which multiple copies of an indication of a write address are stored in the portion 380, the comparison component 355 may compare each stored copy with a corresponding indication of a read address (e.g., in parallel, for latency benefits). If any of the stored write address indication copies do not match the corresponding indication of the read address, an indication of such may be output to an external device (e.g., host device) by way of output component 360 or stored to the mode register 365. For example, a quantity of stored copies of the indication of the write address that match or do not match the corresponding indication of the read address may be indicated, thereby providing an indication of a degree of confidence with respect to whether there is an address error (e.g., that there is a potential address error). Such an indication of a degree of confidence may be provided instead of or in addition to a binary (e.g., yes/no) indication of whether there is an address error (e.g., a binary indication may indicate that there is an address error if any one or more stored indication of the write address does not match the corresponding indication of the read address).

In another example in which multiple copies of an indication of a write address are stored in the portion 380, the comparison component 355 may sequentially compare each stored copy with a corresponding indication of a read address (e.g. comparing one stored copy after another with the corresponding indication of the read address). In some cases, once one of the stored indications of the write address does not match the corresponding indication of the read address, subsequent comparisons may be skipped (e.g., for latency benefits). Alternatively, a quantity of stored copies of the indication of the write address that match or do not match the corresponding indication of the read address may be indicated, thereby providing an indication of a degree of confidence with respect to whether there is an address error (e.g., that there is a potential address error). Such an indication of a degree of confidence may be provided instead of or in addition to a binary (e.g., yes/no) indication of whether there is an address error (e.g., a binary indication may indicate that there is an address error if any one or more stored indication of the write address does not match the corresponding indication of the read address).

In some cases, an indication of a write address may include some or all bits of the write address, and parity information based thereupon may be stored in association (e.g., in the same page or row) within the portion 380. In such cases, in response to a read command, the comparison component 355 may perform a parity check upon a retrieved indication of a write address based upon the related stored parity information. In such cases, even if all of the one or more stored and retrieved indications of write addresses match the corresponding indicate of the read address, a potential address error may be indicated if the parity check identifies a parity error between the stored parity information and newly computed parity information for an indication of a write address.

It is to be understood that any indications of an address error or of a potential address error as described herein may be output to an external device (e.g., host device) by output component 360 and, additionally or alternatively, may be stored to mode register 365 (e.g., for subsequent polling by the external device, or for error logging or performance tracking). Further, operations (e.g., comparisons) and indications described herein may be at the memory array 305 level, the subarray 315 level, or with any other granularity (e.g., different indications of write addresses may be stored and subsequently evaluated on a per-row basis, per-sub-row basis, or otherwise).

In some cases, whether address verification is enabled and utilized—and thus whether indications of write addresses and related information are stored to portion 380, or whether portion 380 is instead used to store other data, and thus the overall amount of data included in a page—may be based on a setting (e.g., content of a field) of the mode register 365.

Figure 4:
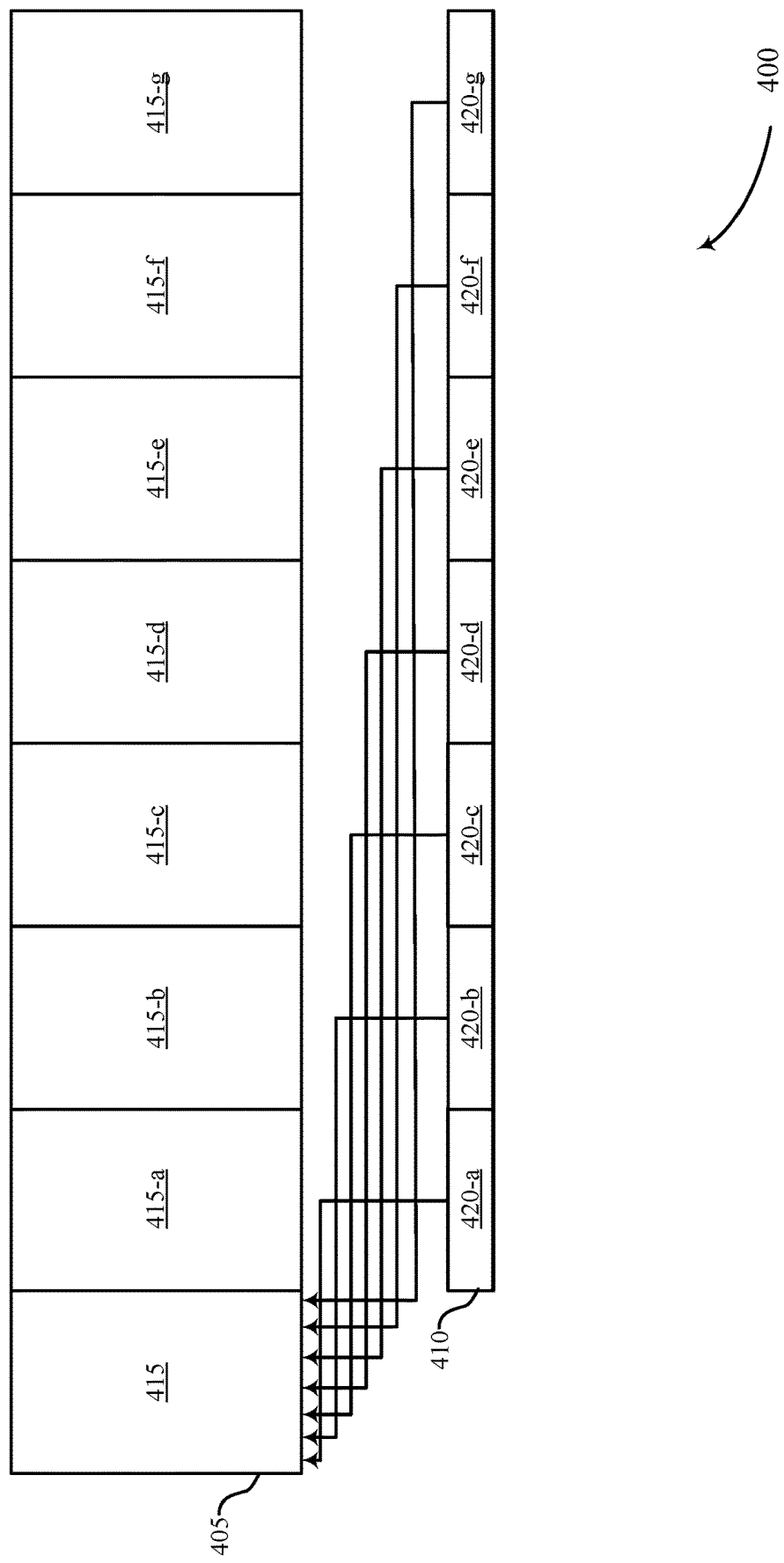
FIG. 4 shows a block diagram that illustrates a storage scheme for an indication of write addresses at a memory device that supports address verification in accordance with examples as disclosed herein.

FIG. 4 shows a block diagram 400 that illustrates a storage scheme for indications of write addresses at a memory device that supports address verification in accordance with examples as disclosed herein. The block diagram 400 may illustrate a plurality of subarrays 415 through 415-g within a memory array 405. The subarrays 415 and memory array 405 may be examples of the subarrays 315 and the memory array 305 as discussed with reference to FIG. 3. The block diagram may also illustrate a set of verification data 410, which may include one or more indications of a write address, possibly along with other verification-related data. In some cases, the set of verification data 410 may correspond to a page (e.g., row) of data, and the set of verification data 410 may include a plurality of subsets 420. Each subset 420 may include one or more bits of verification data corresponding to data stored in a respective sub-page (e.g., sub-page, such as a sub-row). For example, subset 420-a may include one or more bits of verification data corresponding to data stored in a sub-row within subarray 415-a, subset 420-b may include one or more bits of verification data corresponding to data stored in a sub-row within subarray 415-*b*, and so on, where each of the sub-rows are in a same row of the memory array 405. Either a set of verification data 410 or a subset 420 thereof may include an indication of a write address as described herein.

As described with reference to FIG. 3, a portion of the memory array 305 may be configured to store data, and another portion 380 of the memory array 305 may be configured to store sets of verification data 410. A set of verification data 410 may be stored for each write command and associated set of data received by the memory device. For example, as shown in FIG. 4 for exemplary purposes only, the memory array may include eight (8) subarrays 415, and seven (7) of the subarrays 415 may be configured to store data while one (1) subarray 415 or a portion is configured to store sets of verification data 410. For example, subarray 415 may be configured to store sets of verification data 410, and subarrays 415-*a* through 415-*g* may be configured to store data (e.g., as part of same page or row within the memory array 405 as a corresponding set of verification data 410). For example, subarray 415 may correspond to a portion 380 as described with reference to FIG. 3. In other examples (not shown), a portion 380 may include some or all of any quantity of different subarrays 415, any other set of one or more columns within a memory array 305, or any other grouping of memory cells within a memory array 305. Further, in some cases, different columns or other subsets of memory cells with subarray 415 may be configured to store different subsets 420 associated with data stored in a respective subarray 415.

In some cases, each subset 420 may include at least one indication of a sub-page write address for data written to the subarray associated with the subset 420 (e.g., where a write address for a page (e.g., row) comprises one sub-page write address for each sub-page (e.g., sub-row) within the page). As one example, each sub-page write address may include a quantity of address bits (e.g., 28 bits), and in response to a write command for a sub-row within one of subarrays 415-*a* through 415-*g*, some or all of the sub-page write address bits may be stored to the subarray 415 as part of a corresponding subset 420. In some examples, a quantity of most-significant bits and a quantity of least-significant bits of each sub-page address for a subarray 415 may be included in an indication of a sub-page write address. For example, nine (9) most significant bits and nine (9) least-significant bits of each sub-page write address may be included in the indication of the sub-page write address, such that each subset 420 includes at least eighteen (18) bits. If an 18-bit indication of a sub-page write address is included in each subset 420, then the set of verification data 410 may include at least 126 bits in the example of FIG. 4, as there are seven subarrays 415-*a* through subarray 415-*g* used to store data and thus seven subsets 420 in the set of verification data 410.

Further, in some cases, as described herein, multiple copies of each indication of a sub-page write address may be stored as part of a set of verification data 410. For example, if each indication of a sub-page write address includes eighteen (18) bits as in the above example, and each subset 420 includes two copies of the indication of the sub-page write address for the associated subarray 415, then the set of verification data 410 may include at least 252 bits in the example of FIG. 4.

In some examples, each subset 420 may include one or more parity bits associated with a sub-page write address or sub-page of data for the corresponding subarray 415. For example, a memory device may support an internal error correcting or detecting procedure to correct or detect errors associated with transmitting or storing data, which may be referred to as an error correcting code (ECC) procedure. In some cases, the ECC procedure may be single-error-correcting (SEC) or single-error-correcting and double-error-detecting (SECDED). Some SEC schemes may use a fixed quantity of parity bits for each group of data bits of a certain size (e.g., 8 parity bits for each group of 128 data bits). Some SECDED schemes may use an additional bit for each such group (e.g., a 9th parity bit for each group of 128 data bits), and the additional bit may be referred to as the DED bit. The DED bit may indicate whether a quantity of mismatches between two evaluated sets of bits is odd or even (e.g., so that the SEC parity bits may be used to detect and correct single bit (odd-numbered) error but not correct a double bit (even-numbered) error, thereby avoiding the aliasing of a third bit and inadvertent creation of a triple-bit error). For example, the DED bit may be calculated by XOR'ing all bits in the associated group. In some cases, a memory device may internally calculate a DED bit based on a group of bits written to a memory array, or the memory device may receive a DED bit for the group of bits (e.g., a host device may transmit the DED bit in association with the group of bits as part of ECC scheme for detecting transmission errors associated with transmitting the group of bits to the memory device for writing to the memory array).

As one example, each subset 420 may include one or more DED bits, each DED bit for a corresponding group of bits written to the subarray 415 associated with the subset 420. For example, each subarray 415 may be 256 columns wide, and thus each sub-page of data may include 256 bits (e.g., stored to 256 memory cells in a sub-row). A DED bit may be computed for each group of 128 bits within a sub-page, and thus each sub-page may be associated with two (2) DED bits—and thus each subset 420 may thus include two (2) DED bits. In some cases, redundant copies of DED bits may be included in subsets 420—e.g., each DED bit may be stored to the portion 380 in triplicate (as one example of a redundancy factor), and thus, each subset 420 may include six (6) DED bits. Accordingly, 42 DED bits, and thus at least 42 parity bits, may be stored to the subarray 415 in association with a page of application data written in response to a write command (six (6) DED bits for each sub-page of application data). In some cases, storage of DED bits within the memory array may be referred to as internal double-bit error detection (ISDED).

In some cases, the quantity of bits included in each indication of a write address may depend on what other information, if any, is included in a set of verification data 410 (e.g., based on fixed quantity of memory cells included in a portion 380 of a memory array, and in the portions of rows therein). The quantity of bits included in each indication of a write address may be adjusted, for example, depending on whether other verification schemes are enabled, and thus whether some memory cells in a portion 380 may be used for other purposes. As one example, if ISDED and ADCV are both enabled, then each indication of a sub-page write address may be reduced from eighteen (18) bits fourteen (14) bits—e.g., from nine (9) MSBs and nine (9) LSBs to seven (7) MSBs and seven (7) LSBs. Thus, in the example of FIG. 4, if each indication of a sub-page write address is stored in duplicate, the set of verification data 410 may include 196 bits (fourteen (14) bits per subarray 415 multiplied by seven (7) subarrays 415 multiplied by two (2)), which may accommodate 42 DEDs bits as described above within the subarray 415 (e.g., because 196 plus 42 is less than 256).

In some cases, whether ADCV, ISDED, or both are enabled may depend on one or more settings in a mode register (e.g., the mode register 365). In some cases, certain verification schemes—e.g., ADCV, ISDED—may be enabled or disabled together, based on a single setting (e.g., single field, single bit) in the mode register.

Figure 5:
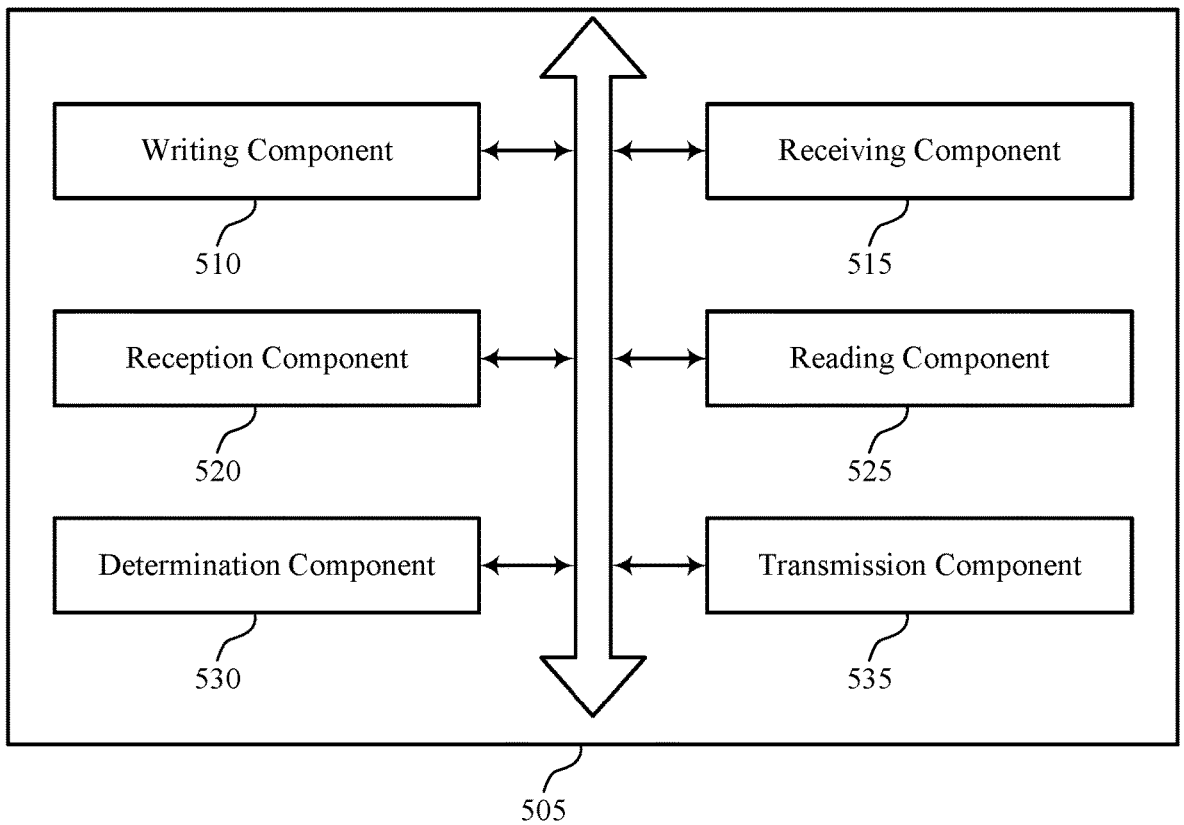
FIG. 5 shows a block diagram of a memory device that supports address verification for a memory device in accordance with aspects of the present disclosure.

FIG. 5 shows a block diagram 500 of a memory device 505 that supports address verification for a memory device in accordance with examples as disclosed herein. The memory device 505 may be an example of aspects of a memory device as described with reference to FIGS. 3 and 4. The memory device 505 may include a writing component 510, a receiving component 515, a reception component 520, a reading component 525, a determination component 530, and a transmission component 535. Each of these modules may communicate, directly or indirectly, with one another (e.g., via one or more buses).

The reception component 520 may receive, at a memory device that includes an array of memory cells, a command to write data to an address within the array. The writing component 510 may write the data to the array based on the command. In some examples, the writing component 510 may write an indication of the address to the array based on the command.

In some examples, the reception component 520 may receive a second command to read the data from the array, the second command associated with a second address within the array. In some examples, the reading component 525 may read, based on receiving the second command, the data and the indication of the address from the array. In some examples, the transmission component 535 may transmit, to a host device for the memory device, signaling based on the data and the indication of the address.

The determination component 530 may determine, based on the indication of the address, whether the second address matches the address, where the signaling indicates the data and whether the second address matches the address. In some examples, the writing component 510 may write, to a mode register at the memory device, an indication that the second address does not match the first address. In some examples, the signaling indicates the data and the first address.

In some examples, the writing component 510 may write the data to a first portion of a page of memory cells within the array. In some examples, the writing component 510 may write the address to a second portion of the page.

In some examples, the page address includes memory cells associated with a same row address. In some examples, the page of memory cells includes memory cells within a plurality of subarrays, the first portion of the page is within a first subarray of the plurality, and the second portion of the page is within a second subarray of the plurality.

In some examples, the address includes a plurality of bits and the indication of the address includes at least a subset of the plurality of bits. In some examples, the address includes a plurality of bits and one or more parity bits may be calculated based on the plurality of bits, where the indication of the address includes one or more parity bits.

In some examples, the writing component 510 may write a copy of the indication of the address to the array based on the command.

In some examples, the reception component 520 may receive a second command to read the data from the array, the second command associated with a second address within the array. In some examples, the reading component 525 may read, based on the second command, the data, the indication of the address, and the copy of the indication of the address. In some examples, the determination component 530 may determine whether the second address corresponds to at least one of the indication of the address or the copy of the indication of the address. The transmission component 535 may transmit, to a host device for the memory device, signaling that indicates the data and a validity of the data, the validity of the data based on whether the second address corresponds to at least one of the indication of the address or the copy of the indication of the address.

The reception component 520 may receive, at a memory device that includes an array of memory cells, a second command to read data from the array, the second command associated with a second address within the array. The reading component 525 may read the data from the array based on the second command and the second address. In some examples, the reading component 525 may read from the array, based on the second command, an indication of a first address within the array, the first address associated with a first command to write the data to the memory array. In some examples, the transmission component 535 may transmit, based on the second command, the data and an indication of whether the second address matches the first address.

In some examples, a row of memory cells that corresponds to the second address may be accessed, where the data is read from a first portion of the row and the indication of the first address is retrieved from a second portion of the row.

In some examples, the reception component 520 may receive the first command at the memory device prior to receiving the second command. In some examples, the writing component 510 may write, based on receiving the first command, the data to the array based on the first address and the indication of the first address to the array.

In some examples, the reading component 525 may read, based on the second command, a second indication of the first address. In some examples, the determination component 530 may determine whether the second address matches the first address based on the indication of the first address and the second indication of the first address.

In some examples, the indication of the first address includes one or more bits included in the first address, or parity information for the first address, or any combination thereof.

Figure 6:
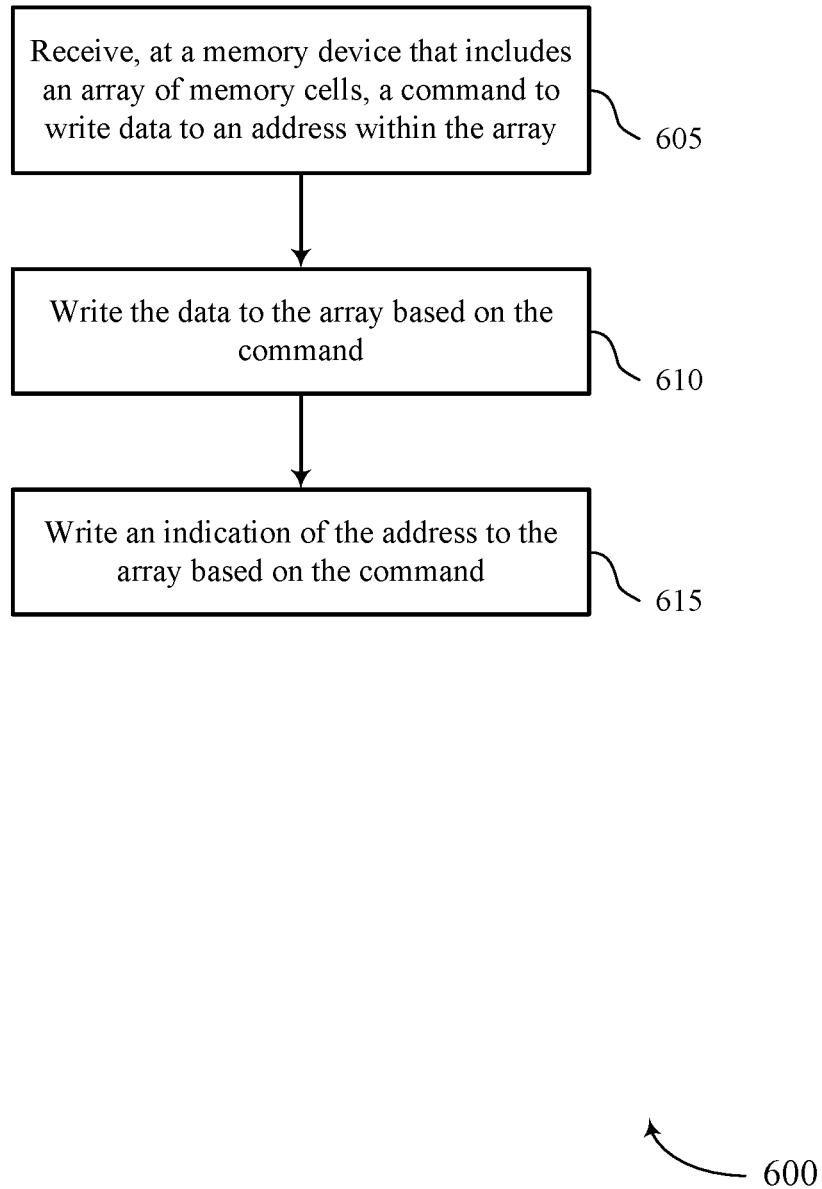
FIGS. 6 through 8 show flowcharts illustrating a method or methods that support address verification for a memory device in accordance with examples as disclosed herein.

FIG. 6 shows a flowchart illustrating a method or methods 600 that supports address verification for a memory device in accordance with aspects of the present disclosure. The operations of method 600 may be implemented by a memory device or its components as described herein. For example, the operations of method 600 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 605, the memory device may receive, at a memory device that includes an array of memory cells, a command to write data to an address within the array. The operations of 605 may be performed according to the methods described herein. In some examples, aspects of the operations of 605 may be performed by a reception component as described with reference to FIG. 5.

At 610, the memory device may write the data to the array based on the command. The operations of 610 may be performed according to the methods described herein. In some examples, aspects of the operations of 610 may be performed by a writing component as described with reference to FIG. 5.

At 615, the memory device may write an indication of the address to the array based on the command. The operations of 615 may be performed according to the methods described herein. In some examples, aspects of the operations of 615 may be performed by a writing component as described with reference to FIG. 5.

In some examples, an apparatus as described herein may perform a method or methods, such as the method 600. The apparatus may include features, means, or instructions (e.g., a non-transitory computer-readable medium storing instructions executable by a processor) for receiving, at a memory device that includes an array of memory cells, a command to write data to an address within the array, writing the data to the array based on the command, and writing an indication of the address to the array based on the command.

Some examples of the method 600 and the apparatus described herein may further include operations, features, means, or instructions for receiving a second command to read the data from the array, the second command associated with a second address within the array, reading, based on receiving the second command, the data and the indication of the address from the array, and transmitting, to a host device for the memory device, signaling based on the data and the indication of the address.

Some examples of the method 600 and the apparatus described herein may further include operations, features, means, or instructions for determining, based on the indication of the address, whether the second address matches the address, where the signaling indicates the data and whether the second address matches the address.

Some examples of the method 600 and the apparatus described herein may further include operations, features, means, or instructions for writing, to a mode register at the memory device, a second indication that the second address does not match the address.

In some examples of the method 600 and the apparatus described herein, the signaling indicates the data and the address.

In some examples of the method 600 and the apparatus described herein, writing the data and the indication of the address to the array may include operations, features, means, or instructions for writing the data to a first portion of a page of memory cells within the array, and writing the address to a second portion of the page of memory cells.

In some examples of the method 600 and the apparatus described herein, the page of memory cells includes memory cells associated with a same row address.

In some examples of the method 600 and the apparatus described herein, the page of memory cells includes memory cells within a set of subarrays, the first portion of the page may be within a first subarray of the set of subarrays, and the second portion of the page may be within a second subarray of the set of subarrays.

In some examples of the method 600 and the apparatus described herein, the address includes a set of bits, and the indication of the address includes at least a subset of the set of bits.

In some examples of the method 600 and the apparatus described herein, the address may include operations, features, means, or instructions for calculating one or more parity bits based on the set of bits, where the indication of the address includes the one or more parity bits.

Some examples of the method 600 and the apparatus described herein may further include operations, features, means, or instructions for writing a copy (e.g., a second copy) of the indication of the address to the array based on the command.

Some examples of the method 600 and the apparatus described herein may further include operations, features, means, or instructions for receiving a second command to read the data from the array, the second command associated with a second address within the array, reading, based on the second command, the data, the indication of the address, and the copy of the indication of the address, determining whether the second address corresponds to at least one of the indication of the address or the copy of the indication of the address, and transmitting, to a host device for the memory device, signaling that indicates the data and a validity of the data, the validity of the data based on whether the second address corresponds to at least one of the indication of the address or the copy of the indication of the address.

Figure 7:
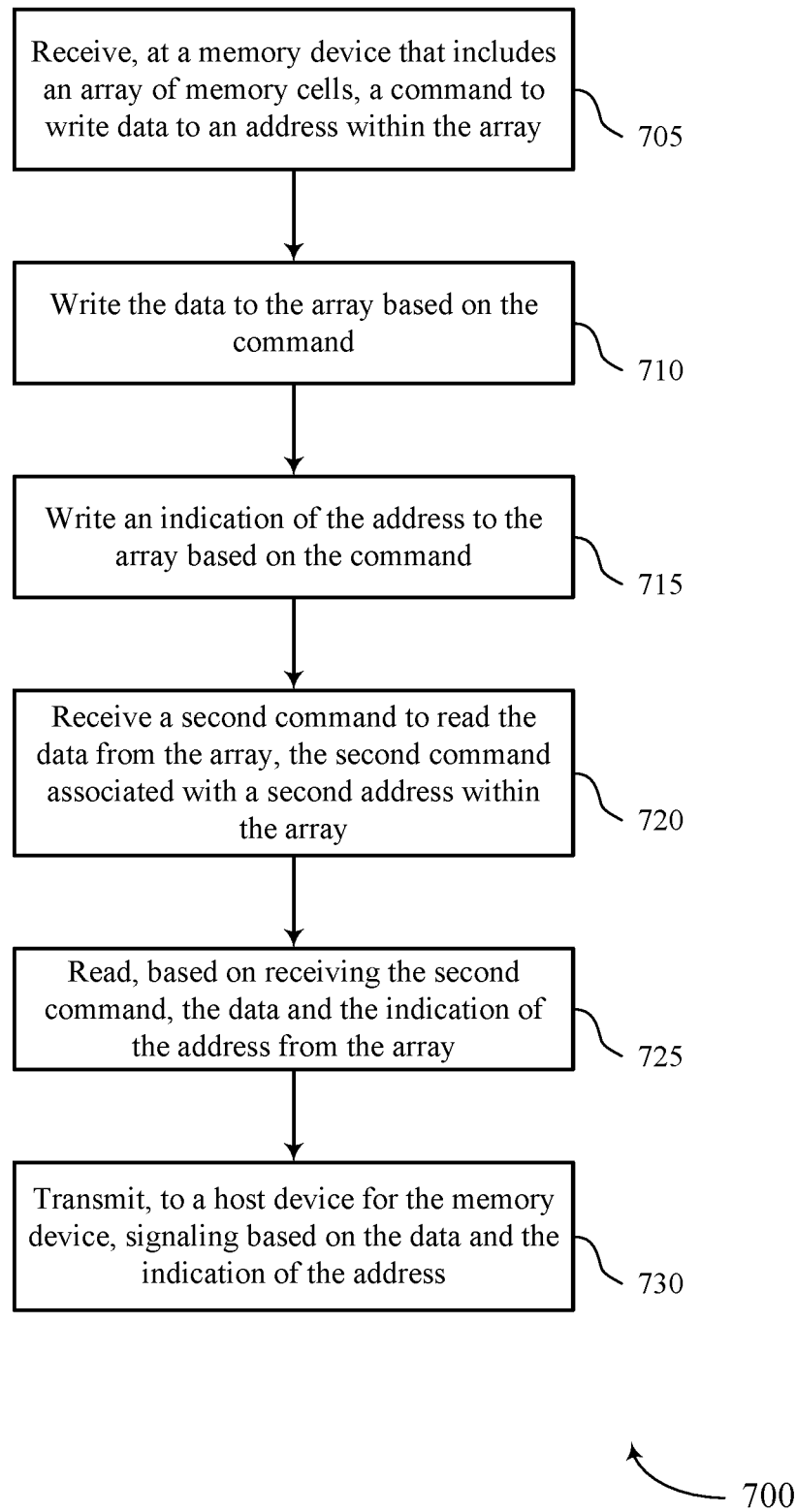

FIG. 7 shows a flowchart illustrating a method or methods 700 that supports address verification for a memory device in accordance with aspects of the present disclosure. The operations of method 700 may be implemented by a memory device or its components as described herein. For example, the operations of method 700 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 705, the memory device may receive, at a memory device that includes an array of memory cells, a command to write data to an address within the array. The operations of 705 may be performed according to the methods described herein. In some examples, aspects of the operations of 705 may be performed by a reception component as described with reference to FIG. 5.

At 710, the memory device may write the data to the array based on the command. The operations of 710 may be performed according to the methods described herein. In some examples, aspects of the operations of 710 may be performed by a writing component as described with reference to FIG. 5.

At 715, the memory device may write an indication of the address to the array based on the command. The operations of 715 may be performed according to the methods described herein. In some examples, aspects of the operations of 715 may be performed by a writing component as described with reference to FIG. 5.

At 720, the memory device may receive a second command to read the data from the array, the second command associated with a second address within the array. The operations of 720 may be performed according to the methods described herein. In some examples, aspects of the operations of 720 may be performed by a receiving component as described with reference to FIG. 5.

At 725, the memory device may read, based on receiving the second command, the data and the indication of the address from the array. The operations of 725 may be performed according to the methods described herein. In some examples, aspects of the operations of 725 may be performed by a reading component as described with reference to FIG. 5.

At 730, the memory device may transmit, to a host device for the memory device, signaling based on the data and the indication of the address. The operations of 730 may be performed according to the methods described herein. In some examples, aspects of the operations of 730 may be performed by a transmitting component as described with reference to FIG. 5.

Figure 8:
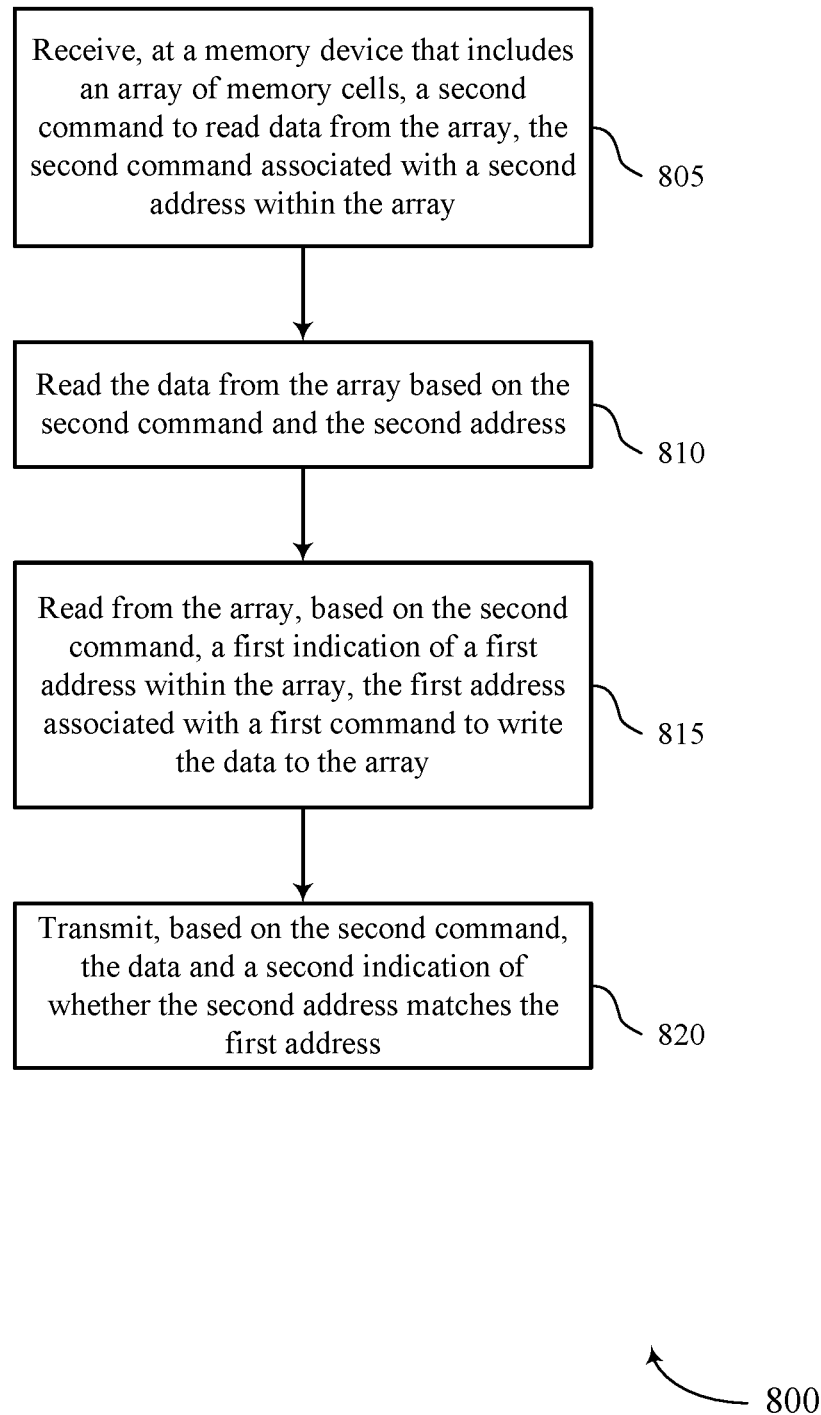

FIG. 8 shows a flowchart illustrating a method or methods 800 that supports address verification for a memory device in accordance with aspects of the present disclosure. The operations of method 800 may be implemented by a memory device or its components as described herein. For example, the operations of method 800 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 805, the memory device may receive, at a memory device that includes an array of memory cells, a second command to read data from the array, the second command associated with a second address within the array. The operations of 805 may be performed according to the methods described herein. In some examples, aspects of the operations of 805 may be performed by a reception component as described with reference to FIG. 5.

At 810, the memory device may read the data from the array based on the second command and the second address. The operations of 810 may be performed according to the methods described herein. In some examples, aspects of the operations of 810 may be performed by a reading component as described with reference to FIG. 5.

At 815, the memory device may read from the array, based on the second command, a first indication of a first address within the array, the first address associated with a first command to write the data to the array. The operations of 815 may be performed according to the methods described herein. In some examples, aspects of the operations of 815 may be performed by a reading component as described with reference to FIG. 5.

At 820, the memory device may transmit, based on the second command, the data and a second indication of whether the second address matches the first address. The operations of 820 may be performed according to the methods described herein. In some examples, aspects of the operations of 820 may be performed by a transmitting component as described with reference to FIG. 5.

In some examples, an apparatus as described herein may perform a method or methods, such as the method 800. The apparatus may include features, means, or instructions (e.g., a non-transitory computer-readable medium storing instructions executable by a processor) for receiving, at a memory device that includes an array of memory cells, a second command to read data from the array, the second command associated with a second address within the array, reading the data from the array based on the second command and the second address, reading from the array, based on the second command, a first indication of a first address within the array, the first address associated with a first command to write the data to the array, and transmitting, based on the second command, the data and a second indication of whether the second address matches the first address.

Some examples of the method 800 and the apparatus described herein may further include operations, features, means, or instructions for accessing, based on the second command, a row of memory cells that corresponds to the second address, where the data is read form a first portion of the row of memory cells and the first indication of the first address is retrieved form a second portion of the row of memory cells.

Some examples of the method 800 and the apparatus described herein may further include operations, features, means, or instructions for receiving the first command at the memory device prior to receiving the second command, and writing, based on receiving the first command, the data to the array based on the first address and the first indication of the first address to the array.

Some examples of the method 800 and the apparatus described herein may further include operations, features, means, or instructions for reading, based on the second command, a third indication of the first address, and determining whether the second address matches the first address based on the first indication of the first address and the third indication of the first address.

In some examples of the method 800 and the apparatus described herein, the first indication of the first address includes one or more bits included in the first address, or parity information for the first address, or any combination thereof.

It should be noted that the methods described above describe possible implementations, and that the operations and the steps may be rearranged or otherwise modified and that other implementations are possible. Furthermore, portions from two or more of the methods may be combined.

An apparatus is described. The apparatus may include an array of memory cells, a command component operable to receive write commands and read commands associated with addresses within the array, and a verification component coupled with the array and the command component, the verification component operable to write, to the array, in response to a write command for data, an indication of an address associated with the write command for the data and receive, from the array, in response to a read command for the data, the indication of the address associated with the write command for the data.

In some examples, the verification component may be further operable to determine whether a second address associated with the read command matches the address associated with the write command based on the indication of the address, and transmit, to a host device for the apparatus, a second indication of whether the second address associated with the read command matches the address associated with the write command.

In some examples, the verification component may be further operable to store to the array, in response to the write command for the data, a copy of the indication of the address associated with the write command for the data, receive from the array, in response to the read command for the data, the copy of the indication of the address associated with the write command for the data, and determine that the second address associated with the read command matches the address associated with the write command when the second address associated with the read command corresponds to at least one of the indication of the address associated with the write command or the copy of the indication of the address associated with the write command.

Some examples of the apparatus may include a mode register coupled with the verification component, where the verification component may be further operable to store a third indication of an error to the mode register when the second address associated with the read command does not match the address associated with the write command.

Some examples of the apparatus may include an output component coupled with the verification component and operable to transmit signals external to the apparatus, where the verification component may be further operable to transmit to the output component the indication of the address associated with the write command for the data.

Some examples of the apparatus may include a decoding component operable to write the data to a first portion of a page of memory cells within the array in response to the write command for the data, where the verification component may be operable to write the indication of the address associated with the write command to a second portion of the page of memory cells.

In some examples, the address associated with the write command includes a set of bits, and the indication of the address associated with the write command includes at least a subset of the set of bits.

In some examples, the indication of the address associated with the write command includes parity information for the address.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, at a memory device that comprises an array of memory cells, a command to write data to an address within the array, wherein the address comprises a plurality of bits;
   calculating one or more parity bits based at least in part on the plurality of bits of the address;
   writing the data to a first portion of a page of memory cells in a first subarray of the array based at least in part on the command;
   writing the address to a second portion of the page of memory cells; and
   writing an indication of the address to a second subarray of the array based at least in part on the command, wherein the indication of the address comprises the one or more parity bits and one or more double-error-detecting (DED) bits, the indication of the address being for verifying that a correct address is accessed.

2. The method of claim 1, further comprising:
   receiving a second command to read the data from the array, the second command associated with a second address within the array;
   reading, based at least in part on receiving the second command, the data and the indication of the address from the array; and
   transmitting, to a host device for the memory device, the data and an error indication based at least in part on the data and the indication of the address.

3. The method of claim 2, further comprising:
   determining, based at least in part on the indication of the address, whether the second address matches the address, wherein the error indication indicates whether the second address matches the address.

4. The method of claim 3, wherein the second address does not match the address, further comprising:
   writing, to a mode register at the memory device, a second indication that the second address does not match the address.

5. The method of claim 1, wherein writing the data and the indication of the address to the array comprises:
   writing the data to a first portion of a page of memory cells within the array; and
   writing the address to a second portion of the page of memory cells.

6. The method of claim 1, wherein the page of memory cells comprises memory cells associated with a same row address.

7. The method of claim 1, wherein:
   the page of memory cells comprises memory cells within a plurality of subarrays;
   the first portion of the page is within the first subarray; and
   the second portion of the page is within the second subarray.

8. The method of claim 1, wherein:
   the indication of the address comprises at least a subset of the plurality of bits.

9. The method of claim 1, further comprising:
   writing a copy of the indication of the address to the array based at least in part on the command.

10. The method of claim 9, further comprising:
    receiving a second command to read the data from the array, the second command associated with a second address within the array;
    reading, based at least in part on the second command, the data, the indication of the address, and the copy of the indication of the address;
    determining whether the second address corresponds to at least one of the indication of the address or the copy of the indication of the address; and
    transmitting, to a host device for the memory device, signaling that indicates the data and a validity of the data, the validity of the data based at least in part on whether the second address corresponds to at least one of the indication of the address or the copy of the indication of the address.

11. An apparatus, comprising:
an array of memory cells,
a command component in communication with the array and operable to receive write commands and read commands associated with addresses within a first subarray of the array, wherein each address of the addresses comprises a plurality of bits, and
a verification component coupled with the array and the command component, the verification component operable to:
calculate one or more parity bits based at least in part on the plurality of bits of the address;
write, in response to a write command, data to a first portion of a page of memory cells in the first subarray of the array;
write an address associated with the data to a second portion of the page of memory cells;
write, to a second subarray of the array, in response to the write command for data, an indication of an address associated with the write command for the data, wherein the indication of the address comprises the one or more parity bits and one or more double-error-detecting (DED) bits, the indication of the address being for verifying that a correct address is accessed; and
receive, from the array, in response to a read command for the data, the indication of the address associated with the write command for the data.

12. The apparatus of claim 11, wherein the verification component is further operable to:
determine whether a second address associated with the read command matches the address associated with the write command based at least in part on the indication of the address; and
transmit, to a host device for the apparatus, a second indication of whether the second address associated with the read command matches the address associated with the write command.

13. The apparatus of claim 12, wherein the verification component is further operable to:
store to the second subarray of the array, in response to the write command for the data, a copy of the indication of the address associated with the write command for the data;
receive from the second subarray of the array, in response to the read command for the data, the copy of the indication of the address associated with the write command for the data; and
determine that the second address associated with the read command matches the address associated with the write command when the second address associated with the read command corresponds to at least one of the indication of the address associated with the write command or the copy of the indication of the address associated with the write command.

14. The apparatus of claim 12, further comprising:
a mode register coupled with the verification component, wherein the verification component is further operable to store a third indication of an error to the mode register when the second address associated with the read command does not match the address associated with the write command.

15. The apparatus of claim 11, further comprising:
an output component coupled with the verification component and operable to transmit signals external to the apparatus, wherein the verification component is further operable to transmit to the output component the indication of the address associated with the write command for the data.

16. The apparatus of claim 11, further comprising:
a row decoder and a column decoder coupled to the array and the command component and operable to write the data to a first portion of the page of memory cells within the array in response to the write command for the data, wherein the verification component is operable to write the indication of the address associated with the write command to the second portion of the page of memory cells.

17. The apparatus of claim 11, wherein:
the indication of the address associated with the write command comprises at least a subset of the plurality of bits.

18. A method comprising:
receiving, at a memory device that comprises an array of memory cells, a second command to read data from a first subarray of the array, the second command associated with a second address within the array;
reading the data from a first portion of a page of memory cells in the first subarray of the array based at least in part on the second command and reading the second address from a second portion of the page of memory cells;
reading from a second subarray of the array, based at least in part on the second command, a first indication of a first address within the array, the first address associated with a first command to write the data to the first subarray of the array, the first address comprising a plurality of bits, the first indication of the first address comprising one or more parity bits and one or more double-error-detecting (DED) bits, and the first indication of the first address being for verifying that a correct address is accessed; and
transmitting, based at least in part on the second command, the data and a second indication of whether the second address matches the first address.

19. The method of claim 18, further comprising:
accessing, based at least in part on the second command, a row of memory cells that corresponds to the second address, wherein:
the data is read from a first portion of the row of memory cells; and
the first indication of the first address is retrieved from a second portion of the row of memory cells.

20. The method of claim 18, further comprising:
receiving the first command at the memory device prior to receiving the second command; and
writing, based at least in part on receiving the first command, the data to the first subarray of the array based at least in part on the first address and the first indication of the first address to the array.

21. The method of claim 18, further comprising:
reading, based at least in part on the second command, a third indication of the first address; and
determining whether the second address matches the first address based at least in part on the first indication of the first address and the third indication of the first address.

22. The method of claim 18, wherein the first indication of the first address comprises one or more bits included in the first address.

\* \* \* \* \*